US012614664B2

(12) United States Patent
Södö

(10) Patent No.: US 12,614,664 B2
(45) Date of Patent: Apr. 28, 2026

(54) METHOD FOR PRODUCING AN INDUCTOR

(71) Applicant: Vacon Oy, Vaasa (FI)

(72) Inventor: Nicklas Södö, Nordborg (DK)

(73) Assignee: VACON OY, Vaasa (FI)

( * ) Notice: Subject to any disclaimer, the term of this patent is extended or adjusted under 35 U.S.C. 154(b) by 609 days.

(21) Appl. No.: 17/842,855

(22) Filed: Jun. 17, 2022

(65) Prior Publication Data

US 2022/0319755 A1 Oct. 6, 2022

Related U.S. Application Data

(62) Division of application No. 16/609,637, filed as application No. PCT/EP2017/062565 on May 24, 2017, now Pat. No. 11,538,613.

(51) Int. Cl.

*H01F 41/08* (2006.01)
*H01F 41/04* (2006.01)
*H01F 41/10* (2006.01)
*H01F 17/04* (2006.01)
*H01F 17/06* (2006.01)
(Continued)

(52) U.S. Cl.

CPC ........... *H01F 41/08* (2013.01); *H01F 41/041* (2013.01); *H01F 41/10* (2013.01); *H01F 17/04* (2013.01); *H01F 17/06* (2013.01); *H01F 27/08* (2013.01); *H01F 27/255* (2013.01)

(58) Field of Classification Search

CPC ........ H01F 27/26; H01F 27/263; H01F 41/08; H01F 17/06; H01F 41/10; H01F 27/38; H01F 41/041; H01F 2003/106; H01F 27/255; H01F 17/04
See application file for complete search history.

(56) References Cited

U.S. PATENT DOCUMENTS 6,031,442 A 2/2000 Nakazawa
2002/0020052 A1 2/2002 Ito et al.
(Continued)

FOREIGN PATENT DOCUMENTS

CN 1366314 A 8/2002
CN 1172330 C 10/2004
(Continued)

OTHER PUBLICATIONS

Wallrabe et al, "3D Ultra-Fast Manufactured Micro Coils on Polymer or Metal Cores," in SAIEE Africa Research Journal, vol. 101, No. 1, pp. 42-44, Mar. 2010. (Year: 2010).*
(Continued)

*Primary Examiner* — A. Dexter Tugbang
(74) *Attorney, Agent, or Firm* — McCormick, Paulding & Huber PLLC

(57) ABSTRACT

An inductor and a method for producing an inductor are provided where the inductor includes a first core made of a first magnetic material, and at least two windings, configured to be twisted with each other and embedded within the first core, each winding having a pair of terminals extending out of the first core. A method for producing an inductor includes providing a package of the at least two windings twisted and separated from each other, and forming the first core from the first magnetic material over the at least two windings. A method for producing an inductor includes forming a second core from a second magnetic material over the first core.

5 Claims, 7 Drawing Sheets

(51) Int. Cl.

| | |
|---|---|
| *H01F 27/08* | (2006.01) |
| *H01F 27/255* | (2006.01) |

(56) References Cited

U.S. PATENT DOCUMENTS

| | | | | |
|---|---|---|---|---|
| 2003/0163915 | A1 | 9/2003 | Takayama et al. | |
| 2011/0260825 | A1* | 10/2011 | Doljack | H01F 17/04 29/606 |
| 2012/0075047 | A1 | 3/2012 | Luckey et al. | |
| 2015/0195956 | A1* | 7/2015 | Linderman | H01F 27/08 363/141 |
| 2015/0340147 | A1* | 11/2015 | Pennander | H01F 27/255 336/212 |
| 2016/0064139 | A1 | 3/2016 | Chuang | |
| 2016/0126829 | A1* | 5/2016 | Wang | H01F 2003/106 363/44 |
| 2016/0189856 | A1* | 6/2016 | Sarder | H01F 27/38 336/198 |

FOREIGN PATENT DOCUMENTS

| | | | | |
|---|---|---|---|---|
| CN | 102832019 | A | 12/2012 | |
| CN | 103887041 | A1 | 6/2014 | |
| DE | 199 22 122 | A1 | 11/1999 | |
| EP | 0 475 522 | A1 | 3/1992 | |
| EP | 2 551 863 | A1 | 1/2013 | |
| JP | 2018019062 | A * | 2/2018 | H01F 1/147 |

OTHER PUBLICATIONS

International Search Report For PCT Serial No. PCT/EP2017/062565 Dated Feb. 23, 2018.

* cited by examiner

METHOD FOR PRODUCING AN INDUCTOR

CROSS-REFERENCE TO RELATED APPLICATIONS

This application is a divisional application of U.S. application Ser. No. 16/609,637 filed on Oct. 30, 2019, which is a National Stage application of International Patent Application No. PCT/EP2017/062565, filed on May 24, 2017, each of which is hereby incorporated by reference in its entirety.

TECHNICAL FIELD

The present disclosure generally relates to an inductor and a method for producing the same.

BACKGROUND

Currently, common and differential mode inductors are used in circuits for suppressing common mode and differential mode interferences respectively. FIG. 6 shows a specific application of common mode (CM) and differential mode (DM) inductors in the prior art, in which three DM inductors (one for each phase) and one CM inductor are used in a LCL filter. Alternatively, one 3-phase DM inductor plus one CM inductor, or one 4-leg inductor with both DM and CM inductances are also known. Although there are various kinds of different inductors, it is still desired to provide an inductor with smaller size and weight.

SUMMARY

In view of the foregoing, an object of the present disclosure is to overcome or at least mitigate the above shortcoming of the prior art solution by providing an inductor and a method for producing the same as described below.

At one aspect, it provides an inductor, comprising:

a first core made of a first magnetic material; and at least two windings, configured to be twisted with each other and embedded within the first core, each winding having a pair of terminals extending out of the first core.

In one example, the inductor further comprising a second core enclosing the first core, wherein the second core is made of a second magnetic material having a higher magnetic permeability than that of the first magnetic material, and the terminals of the windings extend out of the second core.

In one example, the at least two windings are made of copper or aluminum, the first magnetic material is a mouldable soft magnetic material, and the second magnetic material is a mouldable soft magnetic material or selected from an iron powder material, ferrites or nanocrystalline materials.

In one example, the at least two windings are separated from each other within the first core by a predetermined distance.

In one example, the number of twists of each winding is an integer multiple of the number of turns of the winding.

In one example, the at least two windings comprise two windings, three windings or more.

In one example, the inductor is provided with a cooling passage therein through which coolant flows.

In one example, two terminals for the same winding are located close to each other, or are spaced apart from each other in a circumferential direction, e.g., located at a quarter or a half of a turn of the winding.

In one example, the pairs of terminals of different windings are equally spaced in a circumferential direction.

In one example, the terminals can be located on any surface of the inductor.

In one example, a form factor of the inductor is adjusted so that when being flat, the inductor is provided with a larger radius, or when being thicker, the inductor is provided with a smaller radius.

In one example, the windings have a ring, oval, rectangular, triangle shape or their combination in a plan view.

In one example, the inductor has a cylinder, oval cylinder, tube, triangular prism, sphere, toroidal or donut shape.

In one example, the inductor is applicable to a LCL-filter, a sine filter, dU/dt filters, a converter, a transformer, or an EMI filter.

At a second aspect, it provides a method for producing the inductor as described above, comprising the following steps: 1) providing a package of the at least two windings twisted and separated from each other; and 2) forming the first core from the first magnetic material over the at least two windings.

Alternatively, it provides a method for producing the inductor as described above, comprising the following steps: 1) providing a package of the at least two windings twisted and separated from each other; 2) forming the first core from the first magnetic material over the at least two windings; and 3) forming the second core from a/the second magnetic material over the first core.

In one example, the method further comprising: forming terminals for each of the windings before the step 2) of forming the first core.

In one example, the method further comprising: forming cooling passage for at least one of the windings.

In one example, at least one of the steps is performed by a 3D-printing technique, casting technique or an assembling technique.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION

Figure 1A:
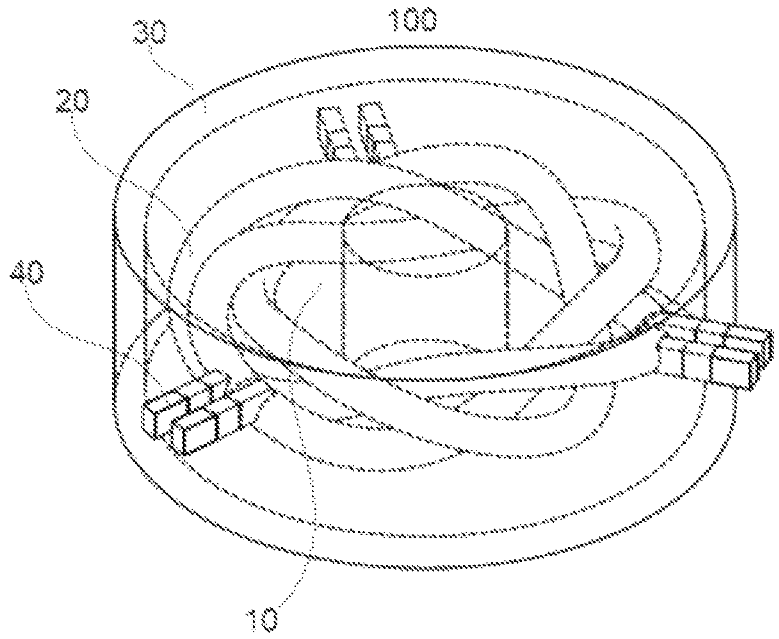
FIG. 1A is a perspective view for schematically showing an inductor in accordance with an embodiment of the present application.

In the discussion that follows, specific details of particular embodiments of the present techniques are set forth for purposes of explanation and not limitation. It will be appreciated by those skilled in the art that other embodiments may be employed apart from these specific details.

As shown in FIGS. 1A-1D, an inductor 100 in accordance with an embodiment of the present application includes a first core 10 made of a first magnetic material; and at least two windings 20 (herein three windings 20) configured to be twisted with each other and embedded within the first core 10. Each winding 20 has a pair of (i.e., two) terminals 40 extending out of the first core 10. It should be noted that the inductor with only such first core can work as a 3-phase differential mode inductor (although with some common mode inductance).

Further, the inductor 100 as shown also includes a second core 30 enclosing the first core 10. The second core 30 is made of a second magnetic material having a higher magnetic permeability than that of the first magnetic material. In this case, the terminals 40 of each winding 20 extend out of the second core 30. In one example, the second core 30 encloses the first core 10 closely. Alternatively, there can also be some air or air gaps between the two cores (i.e., the first and second cores 10 and 30), and in this way the cooling of the inductor can be improved.

The at least two windings 20 are separated from each other within the first core 10 by a predetermined distance, in order to adjust the needed inductance curve. The predetermined distance between the windings 20 determines mainly the differential mode inductance, whereas the permeability and the length of the magnetic path around all the windings 20 determine the common mode inductance. By using different materials, e.g. low permeability material of the first core 10 (close to and in between the windings 20), and higher permeability materials of the second core 30 (for example in the middle and outside on the surface of the inductor), it is possible to adjust the needed common and differential mode inductances almost separated from each other.

Because of the twisted windings 20, also the stray fields out of the inductor 100 should be much less than the case of a single phase inductor. The twisted windings 20 also ensure that the length of the magnetic path is minimized and thus also minimizing the losses of the inductor 100.

In one example, the geometry of the inductor 100 can give a very symmetric inductor. An inductance matrix example is provided with two materials, in which the magnetic permeability of the first magnetic material is 20 and the magnetic permeability of the second magnetic material is 200. This example inductor 100 is used in a LCL filter.

TABLE 1

| Inductance matrix | | | |
|---|---|---|---|
| μH | Phase 1 | Phase 2 | Phase 3 |
| Phase 1 | 275.24 | 154.24 | 154.28 |
| Phase 2 | 154.24 | 276.02 | 154 |
| Phase 3 | 154.28 | 154 | 276.21 |

Taking Phases 1 and 2 as an example, the self-inductances of Phases 1 and 2 are 275.24 μH and 276.02 μH respectively, and the mutual inductance therebetween is 154.24. The differential inductance seen by the filter is the difference between the self-inductance and the mutual inductance, i.e., phase $L_{diff}$ 275.24-154.24=121 uH/phase. Inductance seen between Phases 1 and 2 is $L12_{diff}$=275.24−154.24+276.02−154.24=242.78 uH, which is about 121 uH/phase. As can be seen from this matrix, this geometry gives a very symmetric inductor.

The resulting common mode inductance of the inductor 100 is 194.73 μH (obtained by summing all numbers in the matrix and dividing by 9, the number of cells in the matrix), which is higher than that can be provided by ordinary inductors.

It should be noted that the above two materials are just example materials. The permeability combination can be whatever depending on what kind of materials can be found. The permeability of the materials in combination with the geometry determines the values in the inductance matrix.

With the inductor of the present application, the common mode inductance can be so high that it is possible to make a feedback to the DC-link, thus making a sine filter for both common and differential mode voltages. This is perfect for a sine in sine out drive.

It should be noted that the inductor of the present application can be applicable into a LCL-filter, a sine filter, dU/dt filters, a converter, a transformer, or an EMI filter. Additionally, it can also be applicable to be a filter for converters running with interleaving topology.

Each of the at least windings 20 may have a ring, oval, rectangular, triangle shape or their combination in a plan view. Of course, the winding 20 can also have any other suitable shapes. The cross-section of the windings 20 can vary, too.

The inductor 100 may have one of the following shapes: cylinder, oval cylinder, tube, triangular prism, sphere, toroidal or donut shape. Of course, the inductor can have any other suitable shapes, and the present application is not limited to this.

Figure 4A:
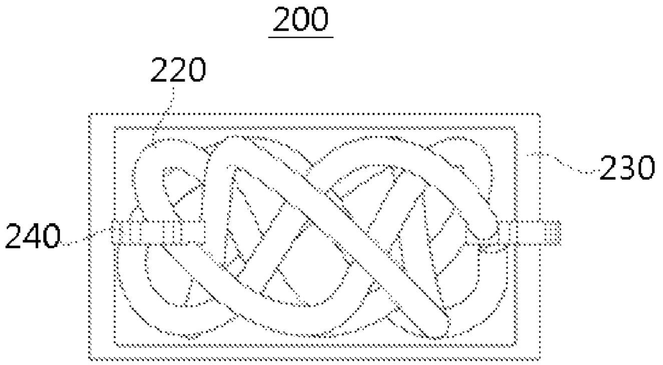
FIG. 4A is a side view of an inductor in accordance with another embodiment of the present application.
Figure 4B:
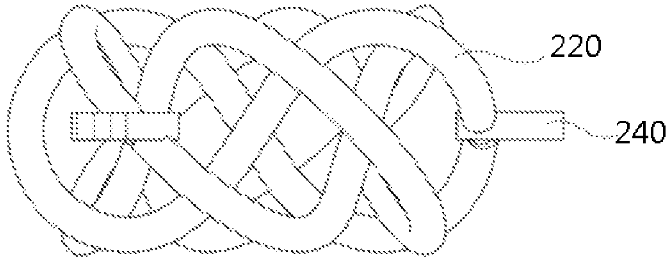
FIG. 4B is a view for showing windings of the inductor as shown in FIG. 4A.

In one example, a form factor of the inductor 100 is adjusted according to actual needs. For example, when being flat, a cylinder inductor is provided with a larger radius, or when being thicker, it is provided with a smaller radius. FIGS. 4A and 4B show an inductor 200 that is thicker with a smaller radius comparing with the inductor 100 shown in FIG. 1A. The inductor 200 has three windings 220, terminals 240, a first core around the windings 220 (not shown for sake of illustration) and a second core 230.

Figure 1B:
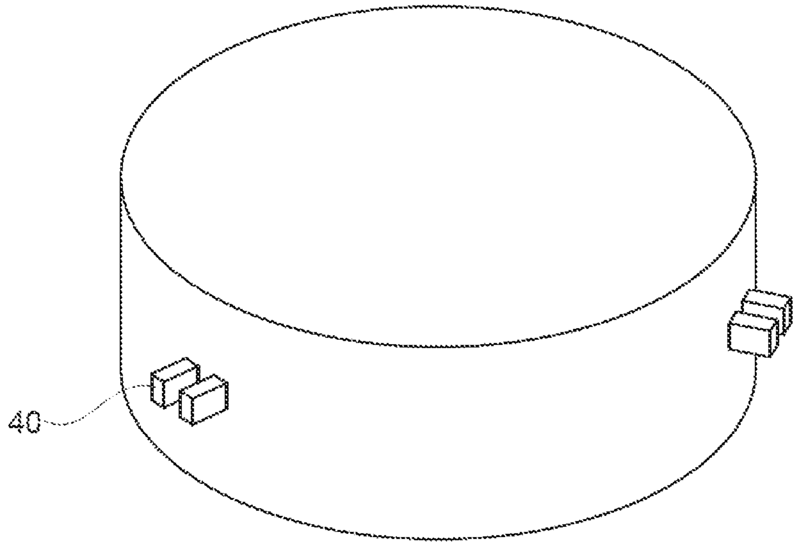
FIG. 1B is a perspective view of the inductor as shown in FIG. 1A.
Figure 1C:
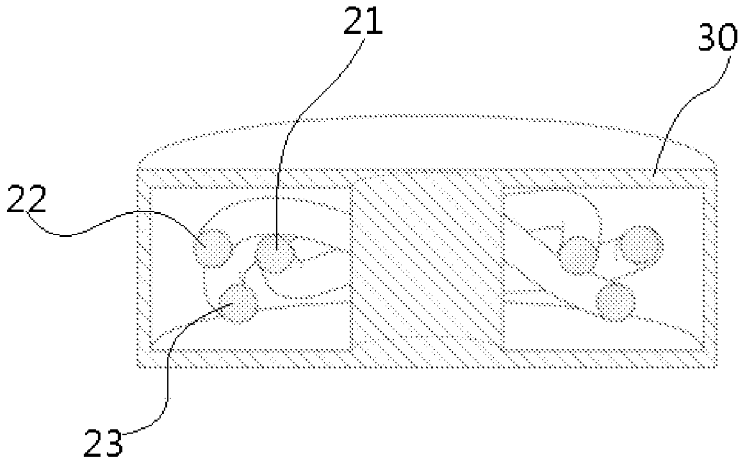
FIG. 1C is a cross-sectional view of the inductor as shown in FIG. 1A, in which the first core is not crosshatched for showing the windings.
Figure 1D:
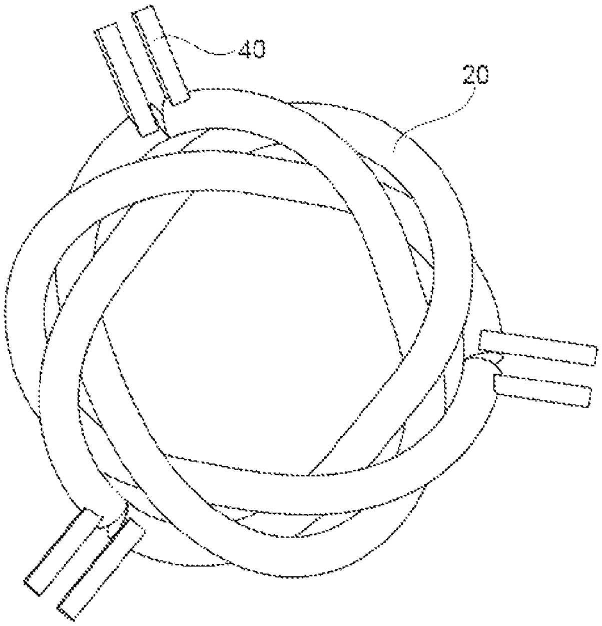
FIG. 1D is a view of windings with terminals for using in the inductor as shown in FIG. 1A.

As shown in FIG. 1D, the at least two windings 20 are twisted two times around each other during one turn. Depending on the design requirement, they can be twisted from one time to N times around each other during one turn. Herein, the expression "being twisted one time" means one winding extends across the other windings from an upper side and then across the other windings from a lower side.

The number of twists of each winding is always an integer multiple of the number of turns of this winding. It should be noted that the two terminals 40 for the same winding can be located close to each other or spaced apart, for example by a quarter or a half of one turn of the winding. If terminals for the same winding are close to each other, as shown in FIGS. 1A-1D, then the number of turns is an integer, and the number of twists of this winding, which being an integer multiple of the number of turn, is also an integer. The number of twists would be an even or odd number, not any half twists etc. On the other hand, if terminals for the same winding are spaced apart, for example, by a half of a turn, then the turn number of the winding could be a half turn or one and a half turn, etc, and the twist number, which being an integer multiple of the turn number, could also be a non-integer.

As shown in FIG. 1B, the pairs of terminals of different windings 40 for different windings 20 are equally spaced in a circumferential direction. Specifically, the terminals 40 are located at an outer surface of the inductor 100. Alternatively, the terminals 40 can be located on any other surface of the inductor, e.g., on an inner surface of, on a top surface of, or on a bottom surface of the inductor 100, according to needs of the mechanics around. In other words, the terminals 40 can be located on any surface of the inductor.

In one example, the at least two windings 20 are made of copper or aluminum, the first magnetic material is a mouldable soft magnetic material, and the second magnetic material is selected from a mouldable soft magnetic material, an iron powder material, ferrites, or nanocrystalline materials.

Figure 2:
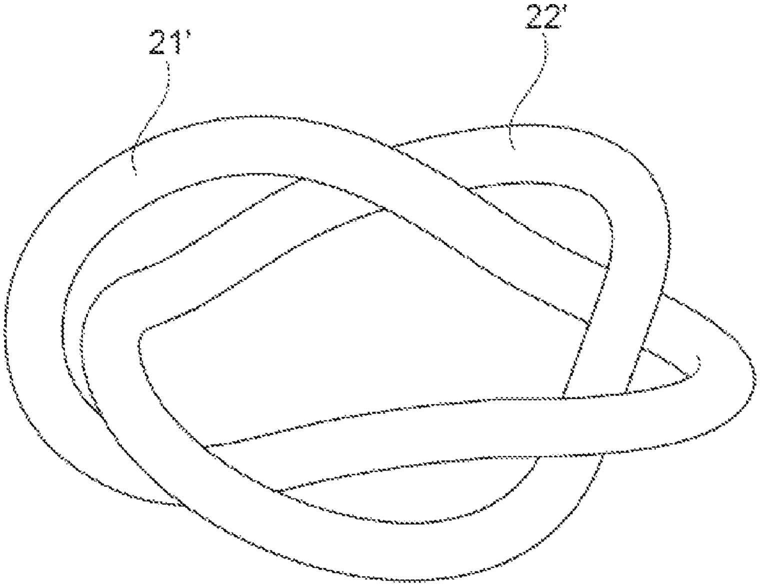
FIG. 2 is a schematic view for showing the windings for using in an inductor in accordance with another embodiment of the present application.

As shown in FIG. 2, it shows the case that the at least two windings 20 includes two windings 21', 22' twisted with each other. It should be understood that in FIG. 2 for sake of convenience, the windings are shown to be endless and terminals are omitted. It is to be understood that the windings are not endless due to terminals.

Figure 3A:
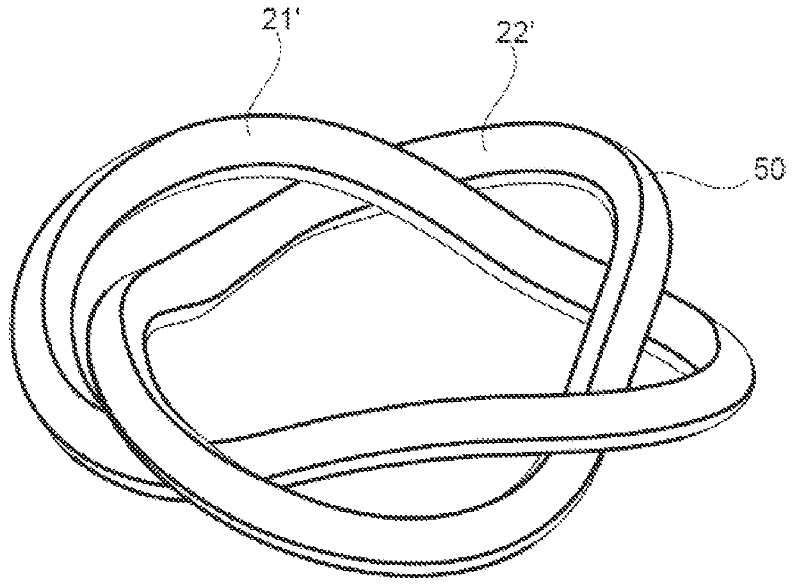
FIG. 3A is a schematic view for showing the windings with a cooling passage for using in an inductor in accordance with a further embodiment of the present application.

Further with reference to FIG. 3A, a cooling passage 50 through which coolant flows is attached to each winding 20. In this way, it would enable very efficient cooling of the windings 20. Of course, the cooling passage 50 can also be formed by any other suitable method and thus the present application is not limited to this. For example, the cooling passages 50 can be formed within the first core 10. The number of the cooling passage 50 provided on the winding 20 can be selected as required.

Figure 3B:
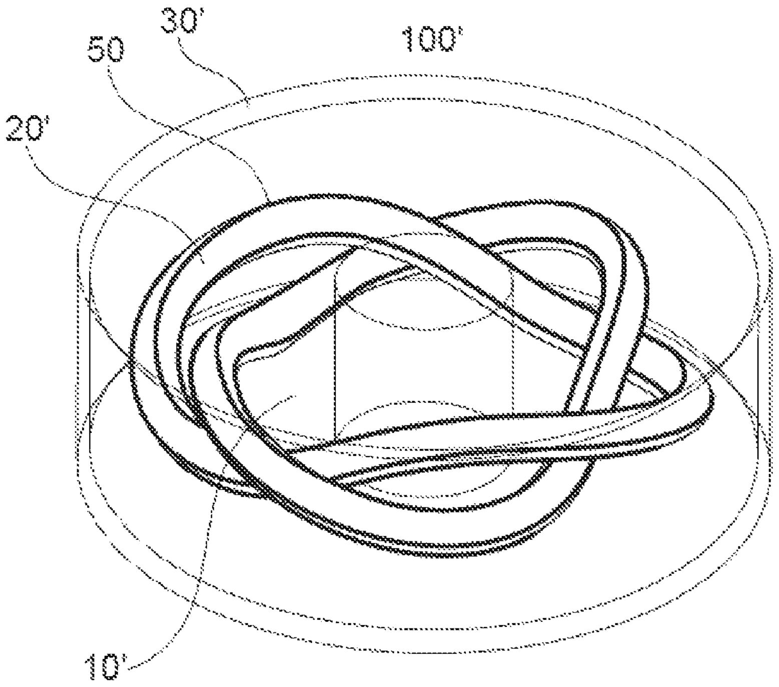
FIG. 3B is a perspective view of an inductor provided with the windings and the cooling passage as shown in FIG. 3A in accordance with an embodiment of the present application.

In order to better illustrate this concept, FIGS. 3A and 3B show the inductor 100' having the windings 20' with the cooling passage 50. In this case, the inductor 100' also includes a first core 10' and a second core 30', which are identical with those as described above, and are not discussed again herein.

Figure 5A:
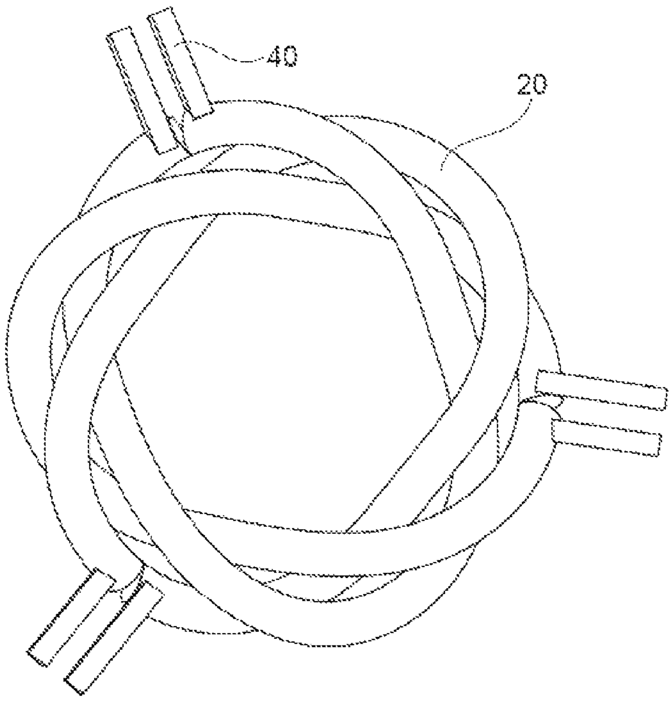
FIGS. 5A-5C are views showing a method for producing an inductor in accordance with one embodiment of the present application.
Figure 5B:
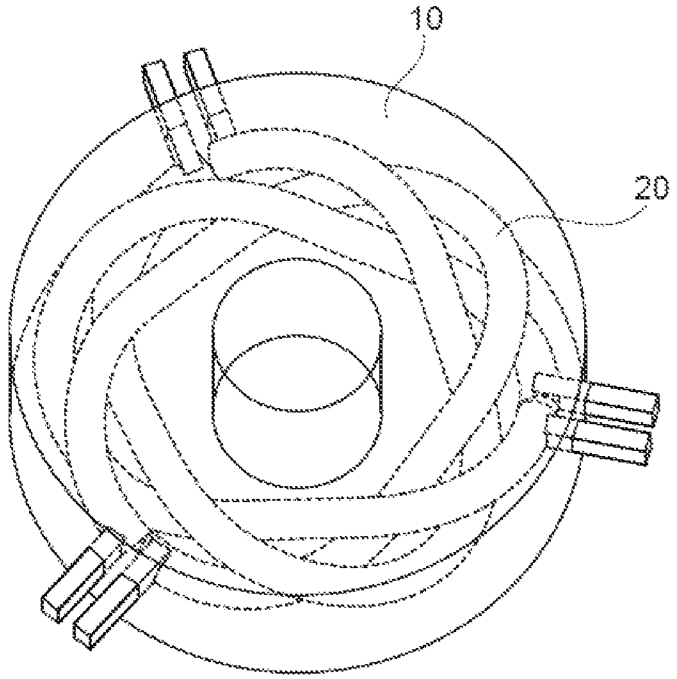
Figure 5C:
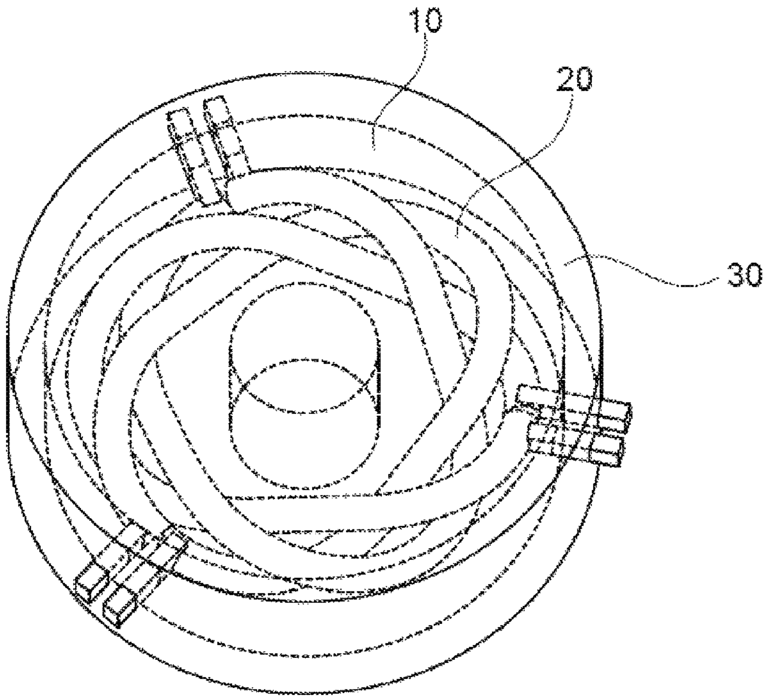
Figure 6:
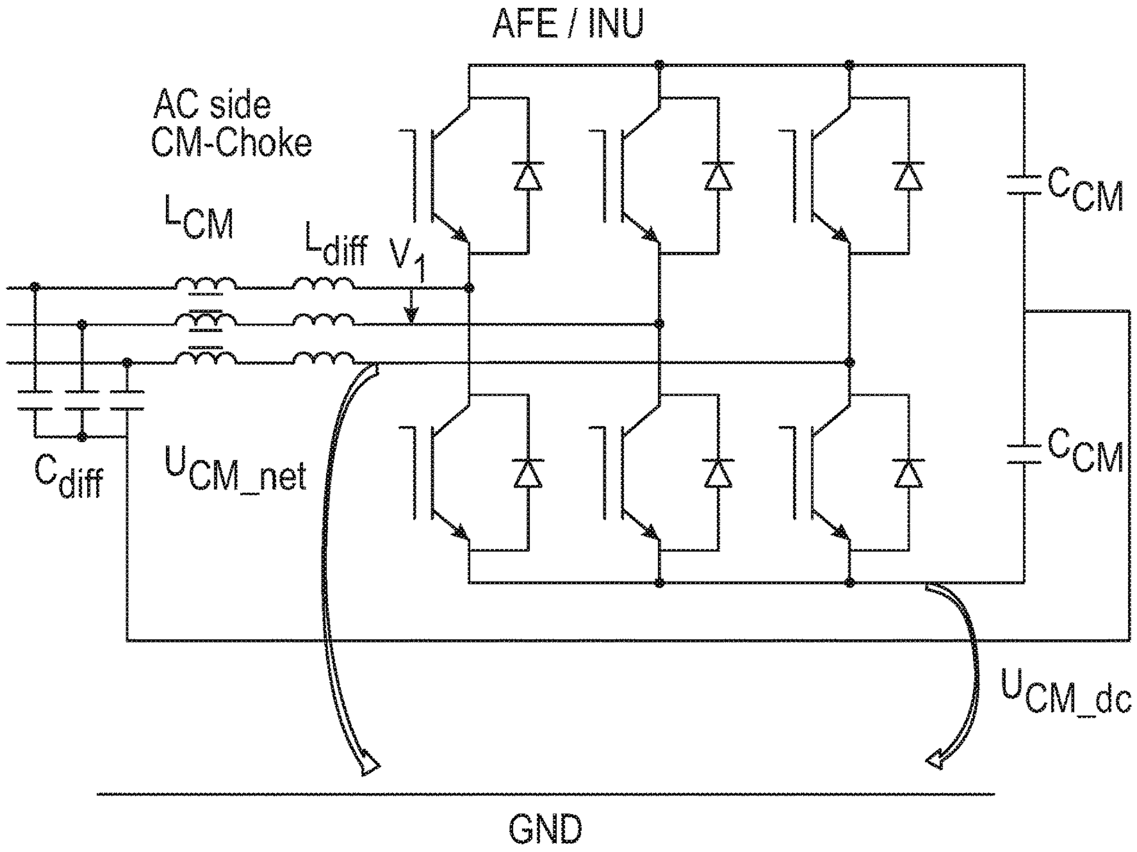
Prior Art FIG. 6
FIG. 6 is a schematic view of showing an arrangement of a specific application of CM and DM inductors in the prior art.

In addition, an embodiment of the present application provides a method for producing the inductor 100, 100' as described above (only references for inductor 100 are marked in the drawings). It includes the following steps of:

1) providing a package of the at least two windings 20 twisted and separated from each other, see FIG. 5A;
2) forming the first core 10, 10' from the first magnetic material over the at least two windings 20, 20', see FIG. 5B; and
3) forming the second core 30, 30' from the second magnetic material over the first core 10, 10', see FIG. 5C.

Further, the method includes forming terminals 40, 40' for each of the windings before the step 2) of forming the first core 10, 10'.

In one example, the method further includes forming the cooling passages 50 for at least one of the windings, before, at the same time as or after the step 1) of providing the package, or at the same time as or after forming the first core 10, 10'.

In one example, the steps 2) or/and 3) is/are performed by a casting technique or an assembling technique.

In one example, the inductors can be produced by a 3D-printing technique. In one specific example, the windings, the cooling passage and the cores can be formed at the same time.

It should be noted that the upcoming 3D-printing technique could provide very good scalability in terms of power for the idea of the present application. Of course, smaller powers (possibility to bend wires is the limiting factor) should be possible to manufacture also without the 3D-printing technique.

Through the method described herein, it is possible to cast the magnetic material around the windings and even to include the cooling passage into the core, thereby enabling very efficient cooling.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method for producing an inductor, the method comprising the following steps:
1) Providing a package of at least two windings twisted and separated from each other; and
2) forming a first core from a first magnetic material over the at least two windings;
wherein the inductor has the first core made of the first magnetic material and the at least two windings being twisted around each other along their entire winding length and entirely embedded within the first core, each winding comprising a pair of terminals extending out of the first core.

2. The method according to claim 1, further comprising: forming the pair of terminals for each of the windings before the step 2) of forming the first core.

3. The method according to claim 1, further comprising: forming cooling passage for at least one of the windings.

4. The method according to claim 1, wherein at least one of the steps is performed by a 3D-printing technique, a casting technique or an assembling technique.

5. A method for producing an inductor, the method comprising the following steps:
1) Providing a package of at least two windings twisted and separated from each other;
2) Forming a first core from a first magnetic material over the at least two windings; and
3) forming a second core from a second magnetic material over the first core;
wherein the inductor has:
the first core made of the first magnetic material;
the at least two windings being twisted around each other along their entire winding length and entirely embedded within the first core, each winding having a pair of terminals extending out of the first core; and
the second core enclosing the first core, wherein the second core is made of a second magnetic material having a higher magnetic permeability than that of the first magnetic material, and the terminals of the windings extend out of the second core.

* * * * *